Figure 1:
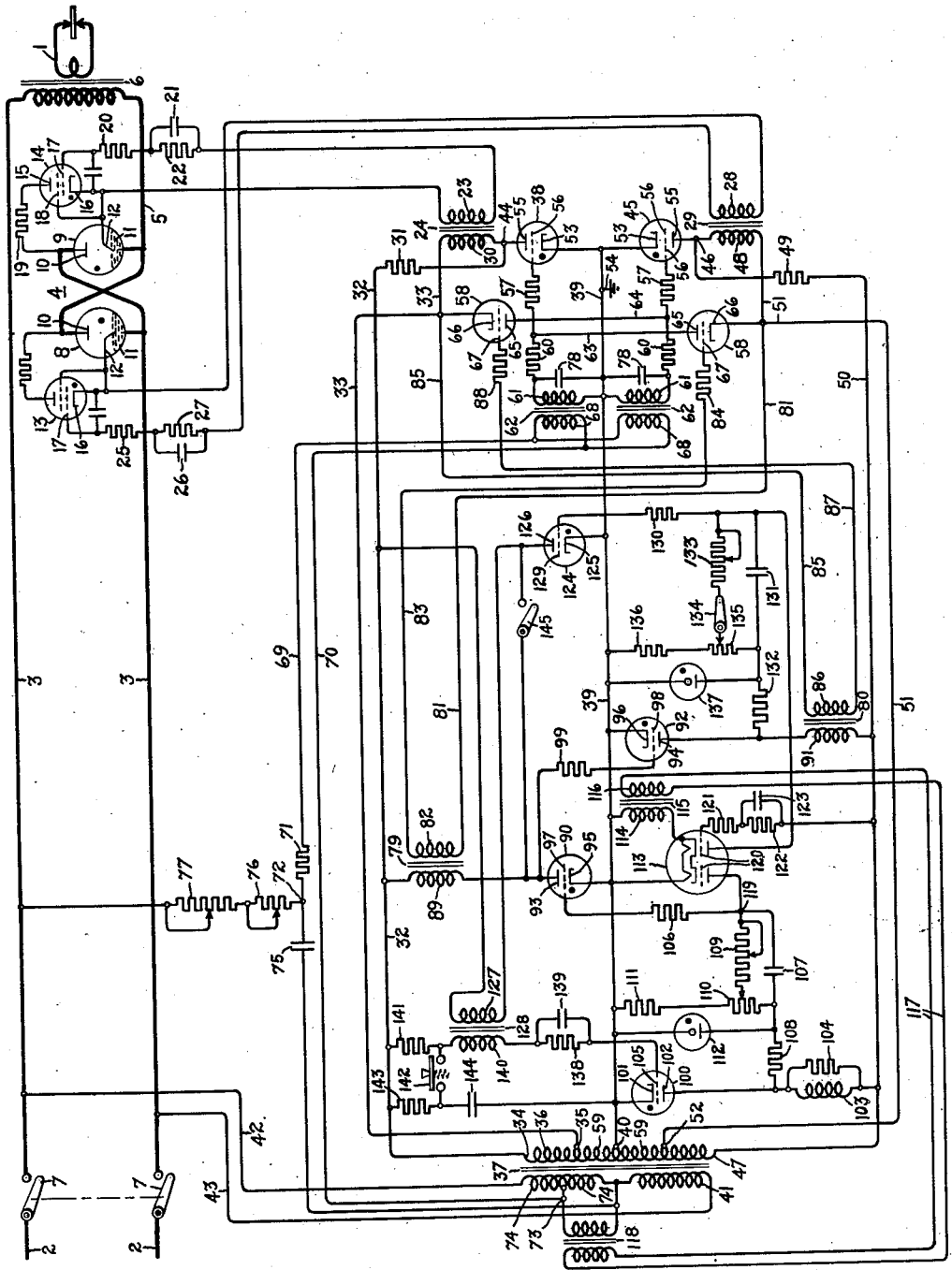

Sept. 23, 1952 — M. E. BIVENS — 2,611,863
ELECTRIC VALVE CONTROL CIRCUITS
Filed June 10, 1947 — 2 SHEETS—SHEET 1

Inventor:
Maurice E. Bivens,
by Claude A. Mott.
His Attorney.

Sept. 23, 1952        M. E. BIVENS        2,611,863

ELECTRIC VALVE CONTROL CIRCUITS

Filed June 10, 1947        2 SHEETS—SHEET 2

Inventor:
Maurice E. Bivens,
by Claude H. Mott
His Attorney.

Patented Sept. 23, 1952

2,611,863

UNITED STATES PATENT OFFICE 2,611,863

ELECTRIC VALVE CONTROL CIRCUITS

Maurice E. Bivens, Schenectady, N. Y., assignor to General Electric Company, a corporation of New York Application June 10, 1947, Serial No. 753,672

12 Claims. (Cl. 250—27)

1

My invention relates to electric valve control circuits and more particularly to new and improved electric valve control circuits for electric translating apparatus which effect intermittent energization of a load circuit and which not only control accurately the period of each energization of the load circuit but also control accurately the interval of time between successive energizations of the load circuit.

In the field of resistance welding, electric valve control circuits have been used, not only to control the timed applications of welding current, but also to control the magnitude of the welding current by the phase shift method in order to obtain the desired heating effect of the welding current on the work parts. Also in order to prevent saturation of the welding transformer, such electric valve control circuits have been used to obtain synchronous starting of welding current flow, that is, initiation of current flow at the same point of the voltage wave of the source, as well as to obtain current flow in full cycle steps. As will be pointed out in greater detail below, I provide an improved alternating current electric valve system which, when used as a resistance welding control, operates synchronously to time in full cycle steps the flow of welding current which is adjustable in magnitude by the phase shift method and which also operates to time in full cycle steps the interval of time between successive energizations of the welding circuit.

It is an object of my invention to provide a new and improved electric valve control circuit.

It is also an object of my invention to provide for high speed operation of an electric valve control system by embodying therein improved electronic timing circuits which effect the intermittent energization of a load circuit and not only control the period of each energization thereof, but also control the interval of time between successive energizations of the load circuit.

It is furthermore an object of my invention to provide such a system which is synchronous in operation and adjustable to determine in full cycle steps the time-on and time-off periods of current flow which is adjustable in magnitude by the phase shift method.

It is another object of my invention to provide a system in which an electric valve operates in trailing response to the lagging voltage drop across a gas valve which is connected in an inductive circuit and which is normally rendered conducting at the beginning of its positive anode voltage but which is held nonconductive by

2 a bucking-out voltage which is applied to its control element whenever the trailing valve becomes conducting.

It is a further object of my invention to control the conductivity of an electric valve by applying to its control element a bias voltage which is rendered effective or ineffective by the conductivity of a controlled rectifier which, when conductive, operates to apply to the control element of the valve the more negative voltage of two branch circuits, one of which supplies the negative bias voltage and the other of which supplies an adjustable sine wave control voltage which renders the valve conducting when the negative bias voltage connection is interrupted by rendering the controlled rectifier nonconducting.

Figure 2:
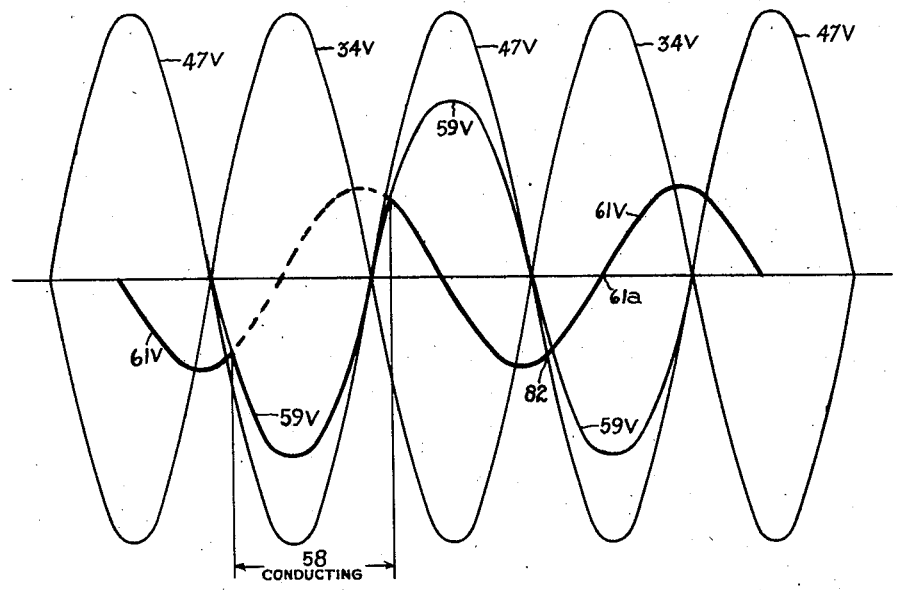
Figure 3:
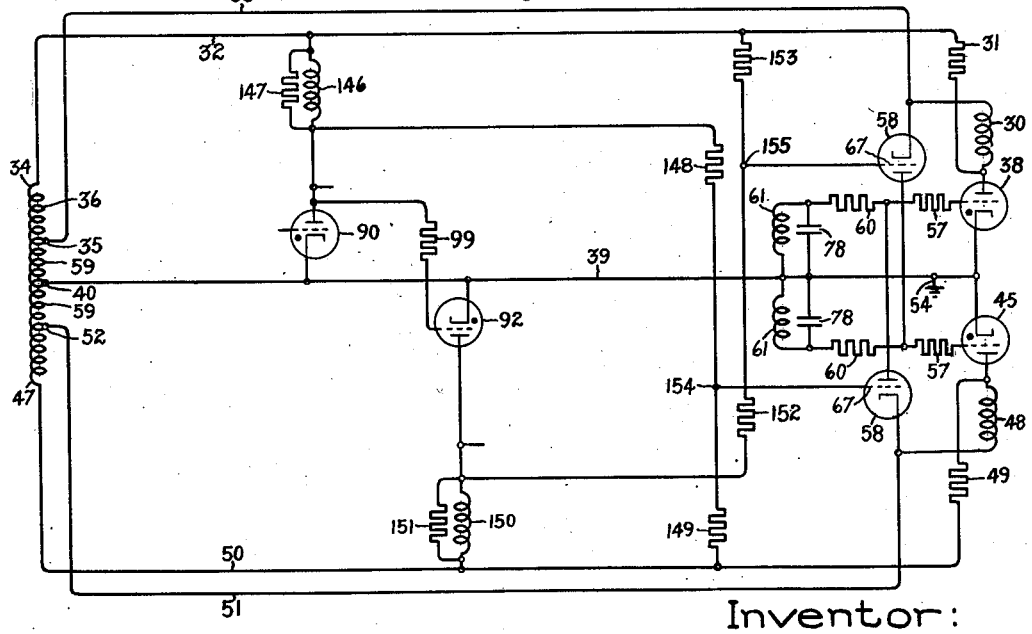

Further objects of my invention will become apparent from a consideration of the embodiments thereof illustrated in Figs. 1 and 3 of the drawings. Fig. 1 is a diagrammatic representation of my invention as applied to a resistance line welding control, and Fig. 3 is a modification of Fig. 1 illustrating an arrangement wherein the control transformers having secondary windings connected in the control element circuits of the rectifiers may be eliminated by employing a network including inductances and resistors for supplying control element voltage to the control elements of these rectifiers. Fig. 2 of the drawings is a graphic representation of the anode and control element voltages of one of a pair of relay electric valves which, by their conductivity and nonconductivity, determine the time-on and time-off periods of welding current flow.

In accordance with the illustrated embodiments of my invention, a pair of electric valves reversely connected in parallel with one another control the flow of welding current from an alternating current supply circuit to the primary winding of a welding transformer having its secondary connected to a pair of cooperating welding electrodes. These power line valves are controlled by reversing the phase of an alternating voltage applied to the control elements of their firing valves by means of a pair of relay valves which are rendered conducting or nonconducting by the application of sine wave voltages of the supply circuit to their control elements.

The control element circuit of each of the two relay electric valves branches into two parallel connected portions, one of which is polarized by a controlled rectifier and contains a source of bias voltage, and the other of which includes a voltage absorbing resistance and a source of control voltage which is adjustable in phase relative to the anode-cathode voltage of the relay valve with which it is associated. The rectifier is connected to conduct current from the nonpolarized branch through the resistor therein so that when conductive the more negative of the bias and control voltages are selectively and automatically applied to the control element of the relay electric valve to render and hold it nonconducting. When the rectifiers are rendered nonconducting, the effect of the bias voltage is removed from the control element circuits of the relay valves and they become conductive in response to the adjustable phase control voltage to reverse the phase of the control voltage applied to the control elements of the firing valves of the power line valves which connect the primary of the welding transformer to the source of alternating current supply.

The controlled rectifiers above mentioned are connected with the source of alternating current supply so that they are normally conducting. They are rendered nonconducting by applying negative voltages to their control elements when a pair of leading and trailing turn-on electric valves are rendered conducting. These leading and trailing turn-on electric valves are rendered conducting by a keying valve and are rendered nonconducting when a turn-off valve becomes conducting and prevents the keying electric valve from becoming conducting.

These last mentioned valves are connected with the alternating current supply circuit through inductive circuits completed through their anodes and cathodes. This will cause the voltage drop across each valve to lag its positive anode voltage by some ten or fifteen degrees and thereby carry over into the negative half cycle of their anode supply voltages. The cathodes of these valves are connected together and their anodes are connected with the supply circuit so that when positive anode voltages are applied to the turn-off and leading turn-on electric valves, negative anode voltages are applied to the keying and lagging turn-on electric valves during one-half cycle of the supply voltage, and so that during the next half cycle of the supply voltage, positive anode voltages are applied to the anodes of the keying and lagging turn-on electric valves while negative anode voltages are applied to the turn-off and leading turn-on electric valves.

The control element of the lagging turn-on electric valve is connected to be responsive to the lagging voltage drop across the leading turn-on electric valve so that conductivity of the leading turn-on electric valve causes the trailing turn-on electric valve to operate in trailing response thereto. The control element of the leading turn-on electric valve is connected through a timing capacitor to be responsive to the trailing voltage drop across the keying electric valve and the turn-off electric valve is connected through a timing capacitor to be responsive to the lagging voltage drop across the trailing turn-on electric valve. The leading turn-on electric valve and the turn-off electric valve consequently become conducting in trailing response to the conductivity of the keing electric valve and trailing turn-on electric valve after time delays determined by the discharge rate of the timing capacitors associated therewith.

The amount of time delay is controlled by adjustable resistors connected across the terminals of the timing capacitors which are charged from the supply circuit through rectifiers whenever the keying and lagging turn-on electric valves are nonconducting. Means in circuit with these rectifiers is provided to oppose the self-generated voltage of the rectifiers and establish the voltage of one terminal of each capacitor relative to another part of the circuit to which its control voltage is applied so that infallible operation of the system will always occur.

The keying electric valve is rendered conducting at the beginning of a positive half cycle of its anode voltage by a control element circuit and may be held nonconducting during a positive half cycle of its anode voltage by a bucking-out voltage introduced into its control element circuit as a result of the conductivity of the turn-off electric valve. Under certain circumstances, this bucking-out voltage can be obtained as a result of the conductivity of the leading turn-on electric valve.

It will thus be seen that by reason of the arrangement described, the firing valves for the main electric valves are controlled with a steep wave front voltage obtained by the phase reversal of their control element voltages through the agency of relay electric valves which are rendered conducting and nonconducting by controlled rectifiers which, when conductive, cause the relay electric valves to be nonconducting and, when nonconducting, cause the relay electric valves to be conducting at points in their anode voltage wave which are adjustable. Furthermore, it will be noted that the controlled rectifiers are rendered conducting and nonconducting for full half cycles of the alternating current supply circuit by the sequential operation of additional electric valves, which operate in trailing response to the lagging voltage drop across their anode-cathode circuits in accordance with a predetermined timing depending upon the adjustment of two capacitors, one of which determines the time-on or heating time and the other of which determines the time-off or cooling time of current flow in the load circuit.

My invention will be better understood from a description of the particular embodiments thereof diagrammatically illustrated in the drawings.

As illustrated in Fig. 1 of the drawings, the load or welding circuit 1 is energized from a source of alternating current 2 through a supply circuit 3, an electric translating apparatus comprising electric valve means 4, a conductor 5 and a welding transformer 6. The supply circuit 3 is connected with the source of supply 2 through manually operable switches 7. Although I have referred to the welding circuit or load circuit as being that portion of the circuit connecting the secondary winding of the welding transformer to the welding electrodes, it is obvious that this load circuit may be as readily considered as also including the welding transformer 6 and its connected conductor 5.

Electric valve means 4 may comprise, as illustrated, a pair of electric power valves 8 and 9 which are reversely connected in parallel to supply alternating current from the supply circuit 3 to the load circuit. The electric valves may be of any of the types well known in the art, but, as illustrated, each comprises an anode 10, a mercury pool cathode 11 and an immersion ignitor-type control element 12. The ignitor elements 12 may be formed of a high resistance material and are arranged in the electric valves so that their tips are immersed in the mercury cathode pools of these valves. The elements of each of these electric valves are enclosed in an envelope which preferably contains, as indicated by the dot, an ionizable medium, such as a gas or vapor.

Electric valves 8 and 9 are provided with control or firing electric valves 13 and 14. Each of these firing valves is provided with an anode 15, a cathode 16, a control element 17, and a shield grid 18 which is directly connected electrically with its cathode. The elements of each of these firing valves are also enclosed in an envelope which preferably contains, as indicated by the dot, an ionizable medium, such as a gas or vapor.

The anode-cathode circuit of each of these firing valves 13 and 14 is connected in series with a current limiting resistor 19 between the ignitor 12 and the anode 10 of its associated main electric valve 8 or 9. The arrangement is such that when a positive anode voltage is applied to either of the electric valves 8 or 9 the same positive anode potential is applied to the firing valves 13 and 14. These valves are rendered conductive by the application of proper control potentials to their control elements 17 and, when conducting, connect the control elements 12 of the electric valves 8 and 9 to their anodes in order to initiate conduction through these electric valves during positive half cycles of anode voltage. Thus the point in the nositive half cycle of anode voltage at which electric valves 8 and 9 become conducting depends on the point in the same positive half cycle of anode voltage at which electric valves 13 and 14 become conducting and this, in turn, depends upon the control potentials applied to the control elements 17 of these electric valves.

The control element 17 of electric valve 14 is connected with its cathode 16 through a control element circuit completed through a current limiting resistor 20, a negative self-biasing means comprising a parallel connected capacitor 21 and resistor 22 and a secondary winding 23 of a control transformer 24. In like manner the control element 17 of electric valve 13 is connected to its cathode 16 through a current limiting resistor 25, a negative self-biasing means comprising a parallel connected capacitor 26 and a resistor 27 and a secondary winding 28 of a control transformer 29. Primary winding 30 of control transformer 24 is permanently connected through a resistor 31 and conductors 32 and 33 to the terminals 34 and 35 of the secondary winding 36 of a transformer 37. It may also be connected through a relay electric valve 38 and conductors 33 and 39 across terminals 35 and 40 of the secondary winding 36 of transformer 37. The terminals of the primary winding 41 of transformer 37 are connected across the supply conductors 3 through conductors 42 and 43. Thus each time electric valve 38 is rendered conducting or nonconducting, the phase of the voltage of the supply circuit 3 applied to the primary winding 30 of control transformer 34 is reversed. The arrangement is such that when positive anode voltage is applied to firing valve 14 and electric valve 38 is nonconducting, the alternating current voltage applied by control transformer 24 by means of its secondary winding 23 connected in the control circuit of electric valve 14 is such as to render electric valve 14 nonconducting. On the other hand, when electric valve 38 becomes conducting, the connection of the primary winding 30 of control transformer 24 is reversed so that the phase of the voltage applied to the control element 17 of electric valve 14 by the secondary 23 thereof is such as to render electric valve 14 conducting. When this occurs, the voltage applied to the control element 17 of electric valve 14 abruptly changes from some negative value to some positive value, thus producing a steep wave front voltage which immediately causes electric valve 14 and its controlled electric valve 9 to become conducting at the same point in the voltage wave irrespective of variations in the negative grid characteristics of these electric valves 9 and 14. The abrupt change in potential applied to the control element 17 of electric valve 14 when electric valve 38 becomes conducting is of particular importance in that the cathode connection of electric valve 14 is tied to one terminal of the primary winding of welding transformer 6 and thus during operation is subjected to abrupt voltage changes which could result in unbalanced firing of the electric valves 8 and 9 if this steep wave front voltage were not provided.

In the same manner that the conductivity of electric valve 38 swings the primary terminal 44 of control transformer 24 from terminal 34 to terminal 40 of the secondary 36 of transformer 37, another relay electric valve 45 swings the primary terminal 46 of control transformer 29 from the secondary terminal 47 of transformer 37 to terminal 40 thereof. Terminal 46 of primary winding 48 of transformer 29 is connected through a resistor 49 and a conductor 50 to the secondary terminal 47 of transformer 37. Another terminal of the primary winding 48 is connected through conductor 51 to the secondary terminal 52 of transformer 37. In each case resistors 31 and 49 not only complete the permanent connection of the primary windings of the control transformers 24 and 29 across terminals 34, 35 and 47, 52 of transformer 37, but they also serve as load current limiting means in order to prevent conduction of electric valves 38 and 45 from short circuiting portions of the secondary winding 36 of transformer 37 through terminals 34, 40 and 47, 40.

When electric valve 45 becomes conducting, the negative alternating bias voltage of winding 28 of transformer 29 abruptly changes to a positive value, rendering electric valve 13 conducting at a time when its anode voltage is positive. Conduction through electric valve 13 renders its controlled electric valve 8 conducting to supply alternating current from the source of supply 3 to the load circuit 5, 6, 1. Relay electric valves 38 and 45 have their cathodes 53 tied directly to conductor 39, which, as illustrated, is connected to ground at 54. Consequently these relay electric valves will have no disturbance in their cathode potentials due to changes in conductivity of the parts of the circuit to which they are connected. It is therefore possible to control these electric valves with alternating current sine wave voltages of low potential, and consequently of moderately steep wave front, and still obtain balanced firing of these electric valves. The fact that these relay electric valves 38 and 45 are of low capacity also aids in this respect since their critical control characteristics will vary very little and, for all practical purposes, may be considered uniform.

The portion of the control circuit thus far described is disclosed and claimed in my application Serial No. 742,754 for Electric Valve Control Circuits, filed April 19, 1947, and now Patent 2,473,238, granted June 14, 1949, and assigned to the assignee of this invention.

Each of the relay electric valves 38 and 45, in addition to its cathode 53, is provided with an anode 55 and a control element 56. These elements of each of these valves are enclosed in an envelope which preferably contains, as indicated by the dot, an ionizable medium, such as a gas or vapor.

The control element 56 of each of these relay electric valves 38 and 45 is connected with its cathode 53 through a control element circuit which selectively and automatically impresses on control element 56 portions of a sine wave bias voltage or an adjustable phase sine wave control voltage in accordance with which is the more negative.

As illustrated in the drawing, the control element circuit for each of the electric valves 38 and 45 branches into two parallel connected portions after passing through a current limiting resistor 57. One of the parallel portions includes, in series with one another, a unidirectional current conducting device 58 and one of the winding sections 59 of secondary 36 of transformer 37 between terminals 52, 40 and 35 thereof. The other parallel portion includes, in series with one another, a resistor 60 and a secondary 61 of a transformer 62. The control circuit for electric valve 38 is completed through unidirectional current conducting device 58 as follows: conductor 63, device 58, conductor 51, terminals 52 and 40 of winding 36 of transformer 37, and conductor 39. The control circuit for electric valve 45 is completed through the other unidirectional current conducting device 58 as follows: conductor 64, device 58, conductor 33, terminals 35 and 40 of the secondary winding 36 of transformer 37, and conductor 39.

Each unidirectional current conducting device 58 polarizes the branch in which it is connected so that current may flow from the nonpolarized branch through resistor 60 thereof which will have a voltage drop corresponding to the difference in voltage of the secondary windings connected in these branch circuits when the resultant voltage is in a direction to cause the unidirectional current conducting device to conduct. The unidirectional current conducting device selectively and automatically impresses on the control element of the electric valves 38 and 45, with which it is associated, the voltage of that branch of the control element circuit which is more negative. These unidirectional current conducting devices 58 are, in accordance with my present invention, controlled rectifiers of the vacuum type having their anodes 65 connected toward the control elements 56 of electric valves 38 and 45 and between resistors 57 and 60 of the control element circuits of these valves. Each of these controlled rectifiers also has a cathode 66 and a control element 67.

The secondary windings 61 of transformers 62 impress on control elements 56 of electric valves 38 and 45 sine wave voltages of the same frequency as the supply circuit and adjustable in phase with regard to the anode-cathode voltages of these electric valves. As will appear below, these adjustable phase sine wave voltages determine the instant in the half cycles of positive anode voltage that conduction is initiated by electric valves 38 and 45, and, consequently, when the load circuit valves 8 and 9 become conducting. They therefore determine the amount of current transmitted to the welding transformer and the work connected in the load circuit.

This heat control is obtained by connecting the primary windings 68 of transformer 62 in parallel with one another and through conductors 69 and 70 in series with a resistor 71 across the output terminals 72 and 73 of a static phase shift network comprising winding sections 74 of the primary winding of transformer 37 which are connected in series with one another and as a unit in parallel with a series circuit through capacitor 75 and resistors 76 ad 77 across supply conductor 3 through conductors 42, 43 and a winding section 41 of the primary of transformer 37. Both resistors 76 and 77 are adjustable, one resistor being adjusted for providing full heat, that is, adjusting the control voltages of windings 61 to render electric valves 38 and 45 conducting at the power factor phase angle of the load, and the other being adjustable to decrease the heat by causing the phase control voltage to fire electric valves 38 and 45 at an adjustable time later in the cycle than the power factor phase angle of the current. A capacitor 78 may be connected across the secondary winding 61 of transformers 62 to increase the impedance of the primary circuits of these transformers and compensate for the exciting current supplied thereto by the phase shift network. This prevents the normally semicircular locus of the control voltage vector from being pulled toward its point of rotation determined by tap 73 of the winding sections 74 of transformer 37. The resistor 71 provides means for reducing the effect of line voltage disturbances on the phase controlled voltages supplied by transformers 76.

The winding sections 59 of the secondary 36 of transformer 37 impress in the control element circuits of electric valves 38 and 45 negative sine wave bias voltages of the same frequency as the supply circuit which is connected through transformer 37 to the anode-cathode circuits of these electric valves. That is, the voltages of these secondary winding sections are in phase opposition to the anode-cathode voltages of these valves.

In accordance with my present invention, the negative bias voltage of winding sections 59 of transformer 37 is rendered ineffective by rendering the controlled rectifiers 58 nonconducting by impressing on their control elements 67 a control voltage suitable to accomplish this result. This control voltage is impressed in the control element circuit of these controlled rectifiers through the agency of transformers 79 and 80. The control element circuit for one of the controlled rectifiers 58 is completed from its cathode 66 through conductor 81, secondary winding 82 of transformer 79, conductor 83, and current limiting resistor 84 to the control element 67 of this rectifier. In like manner the control element circuit of the other rectifiers 58 is completed through conductor 85, primary winding 86 of transformer 80, conductor 87, and current limiting resistor 88 to the control element 67 of this rectifier.

The primary winding 89 of transformer 79 is connected across the terminals 34 and 40 of the secondary 36 of transformer 37 through an electric valve 90. In like manner the secondary 91 of transformer 80 is connected across the terminals 47 and 40 of the secondary winding 36 of transformer 37 through an electric valve 92. By reason of this connection it will be noted that when the anode voltage of electric valve 90 is positive the anode voltage of electric valve 92 is negative, and vice versa. Each of the electric valves 90 and 92, in addition to their anodes 93 and 94 and their cathodes 95 and 96, is provided with control elements 97 and 98. These electrodes are enclosed within an envelope containing, as indicated by the dot, an ionizable medium, such as a gas or vapor.

Electric valve 92 is caused to conduct in trailing fashion in response to the conduction of electric valve 90 by connecting its control element 98 through a current limiting resistor 99 to the anode 93 of electric valve 90. Since the anode-cathode circuit of electric valve 90 is completed through the inductance of the transformer 79, the current flow through this valve will lag its anode voltage and continue over into the next negative half cycle of the anode voltage of electric valve 90 for about the first fifteen degrees thereof while part of the energy stored in this inductive circuit is fed back to the supply circuit. The control voltage thus supplied to the control element 98 of electric valve 92 will be equal to the voltage drop across the anode-cathode circuit of electric valve 90, which will usually be about fifteen volts for gas valves of the type usually used. Thus the electric valve 92 will be rendered conducting at the beginning of a positive half cycle of its anode voltage in trailing response to the conductivity of electric valve 90. If the electric valve 90 is not conducting, then the electric valve 92 will be held nonconducting by the out-of-phase bias voltage applied to its grid 98 by reason of its connection through resistor 99 and the primary 89 of the transformer 79 to terminal 34 of the secondary 36 of transformer 37. Since these electric valves 90 and 92 initiate and maintain the flow of welding current in the power circuit, they will, for convenience, be referred to as leading and trailing turn-on electric valves.

The leading turn-on electric valve 90 becomes conducting in trailing response to the conductivity of a keying electric valve 100. The cathode 101 of this keying valve is connected to terminal 40 of the secondary 36 of transformer 37, and its anode 102 is connected through an inductive load 103, 104 to terminal 47 of this secondary winding. Electric valve 100 is also provided with a control element 105 which, together with the anode 102 and cathode 101, is enclosed in an envelope which, as indicated by the dot, contains an ionizable medium, such as a gas or vapor.

The control element 97 of turn-on electric valve 90 is connected through a current limiting resistor 106, a timing capacitor 107 and a resistor 108 to the anode 102 of keying electric valve 100. Thus, as pointed out above in connection with the trailing operation of electric valve 92 in response to the conductivity of electric valve 90, it will be seen that electric valve 90 operates in trailing response to the conductivity of electric valve 100 after the time delay imposed by the timing capacitor 107. This time delay is made adjustable by the adjustable discharge resistor 109, which is connected across its terminals through an adjustable potentiometer 110, which is connected in series with a resistor 111 across the terminals of a voltage regulating valve 112. The voltage appearing across the voltage regulating valve 112, and consequently across resistor 111 and potentiometer 110, operates to force the voltage of capacitor 107 down at an accelerated rate during the negative half cycle of anode voltage of keying electric valve 100. The arrangement is such that leading turn-on electric valve 90 becomes conducting in trailing response to the conduction of keying electric valve 100 or a full number of cycles thereafter.

The use of the substantially constant voltage drop of a gas valve connected in an inductive circuit for controlling the conduction of another valve in trailing response to the trailing voltage drop across the gas valve, which results from conduction therethrough continuing over into the following negative half cycle of its anode voltage, and the time delay feature of the timing capacitor above described constitute in part the subject matter disclosed and claimed in my application Serial No. 685,330 for Electric Valve Control Circuit, filed July 22, 1946, and assigned to the assignee of this invention.

Capacitor 107 is charged in accordance with the voltage across voltage regulating valve 112, which appears when the keying electric valve 110 is nonconducting. This voltage regulating valve is connected in series with its voltage absorbing resistor 108 across the anode and cathode terminals of the keying electric valve. Voltage regulating valve 112 may be, as indicated, of the gaseous discharge type which, when conducting, maintains across its terminals a substantially constant voltage for different values of current flow therethrough. The particular valve employed is regulated to hold about one hundred five volts across its terminals.

In the system being described the keying electric valve 100 may be nonconductive for only one cycle of the source of supply, and it is during this time that the timing capacitor must be charged. Furthermore, it is desirable to have the capacitor of large capacity so that, for the longer timing periods, the value of the discharge resistor 109 will not be so great that the discharge of the capacitor through stray circuits seriously affects the accuracy of its timing function. Consequently in the system illustrated, this capacitor is charged up through a controlled hot cathode rectifier 113 in accordance with the disclosure and claims in my above identified application Serial No. 742,754 for Patent 2,473,238.

As pointed out in this application, hot cathode rectifiers have a self-generated voltage which will apply to a capacitor in circuit therewith a charge which will interfere with its accurate timing, which, of course, is dependent upon the capacitor receiving only a predetermined charge. This self-generated voltage may be neutralized or overcome by the voltage of the secondary 114 of the filament heating transformer 115 for rectifier 113. The primary winding 116 of transformer 115 is connected through conductors 117 and transformer 118 to be energized from the supply circuit 3 so that the terminal of the secondary 114 of transformer 115, which is connected to the cathode of rectifier 113, is at a positive polarity relative to the cathode 95 of electric valve 90 when a positive anode voltage is applied to rectifier 113. This positive voltage, if of sufficient magnitude, will not only neutralize the self-generated voltage of rectifier 113, but will also positively determine the voltage of terminal 119 of capacitor 107, which is connected to the control element 97 of electric valve 90 relative to the cathode potential of this electric valve.

Thus the circuit arrangement provided will always insure that capacitor 107 can discharge to a value such that a positive firing potential may be applied to the control element 97 of electric valve 90 by the voltage drop across keying electric valve 100. This operation is assured by making the hot cathode rectifier 113 of the controlled type and connecting its control element 120 through a current limiting resistor 121 and a long time constant negative self-biasing means comprising parallel connected resistor 122 and capacitor 123 to terminal 47 of the secondary winding 36 of transformer 37 so that this rectifier becomes conducting only during the middle portion of its positive anode voltage when the voltage of secondary winding 114 is at or above the required value.

Turn-off electric valve 124 has its cathode 125 connected through conductor 39 to terminal 40 of the secondary 36 of transformer 37, and its anode 126 connected through the primary winding 127 of transformer 128 and conductor 32 to terminal 34 of the secondary 36 of transformer 37. This turn-off electric valve is also provided with a control element 129 which, together with its anode and cathode, are, as indicated by the dot, enclosed within an envelope containing an ionizable medium, such as a gas or vapor.

The control element 129 of turn-off electric valve 124 is connected through a current limiting resistor 130, a timing capacitor 131 and a resistor 132 to the anode 94 of trailing turn-on electric valve 92. Consequently, turn-off electric valve 124 operates in trailing response to the conductivity of trailing turn-off electric valve 92 in the same manner as leading turn-on electric valve 90 trails keying electric valve 100, as above described. Timing capacitor 131 is provided with an adjustable discharge resistor 133, which is connected across its terminals through a switch 134 and an adjustable potentiometer 135, which is connected in circuit with a resistor 136 across the terminals of a voltage regulating valve 137. Except for the addition of the switch 134 for opening the discharge circuit of capacitor 131, the elements associated with this capacitor correspond with the elements associated with capacitor 107, previously described. Capacitor 131 is charged through rectifier 113 in accordance with the voltage of electric valve 137 when trailing turn-off electric valve 92 is nonconducting in a manner corresponding to that previously described for capacitor 107.

Keying electric valve 100 is normally held nonconducting by the out-of-phase voltage applied to its control element 105 through its control element circuit which is completed through a negative self-biasing means comprising a parallel connected resistor 138 and capacitor 139, the primary 140 of transformer 128, resistor 141 and conductor 32 to terminal 34 of the primary winding 36 of transformer 37. It is rendered conducting at the beginning of its positive half cycle of anode voltage by the closure of push-button switch 142, which connects its control element 105 to the static phase shift circuit comprising resistor 143 and capacitor 144. So long as switch 142 is maintained closed, keying electric valve 100 will consequently become conducting at the beginning of positive half cycles of its anode voltage, provided, of course, that the bucking-out voltage suitable for holding this electric valve nonconducting is not introduced into its control circuit through the agency of transformer 128. This bucking-out voltage will be supplied each time turn-off electric valve 124 becomes conducting. Since under certain circumstances it is desirable to have this bucking-out voltage applied in response to the conductivity of leading turn-on electric valve 90, the anode 93 of this electric valve may be connected through a switch 145 to the anode 126 of the turn-off electric valve in order to accomplish this result.

The diagrammatic representation of the circuit just described has been simplified by omitting the heating filaments and filament transformers of the various electric valves illustrated, except, of course, for rectifier 113 where it was desirable to indicate these elements in order to describe the manner in which the self-generated voltage of rectifier 113 was neutralized or overcome in order to make the circuit operate in a dependable manner. Certain omissions have been made in order to simplify the circuit, such as the usually employed capacitors connected across the control elements and cathodes of the electric valves to render these valves resistant to faulty operation resulting from transient anode voltages applied thereto. Under certain circumstances it will also be understood that a voltage limiting means may be connected across the primary winding of the welding transformer 6 to protect it from voltage surges, as described and illustrated in my above referred to application Serial No. 742,754 for Patent 2,473,238. As also shown in this earlier filed application, means may also be provided for delaying operation of the system until the various heating circuits of the electric valves have been in operation for a suitable length of time to render it safe to apply anode potential to these electric valves.

The features and advantages of the system just described will be better understood from the following description of its operation.

The operating pattern of the system will be set by adjusting resistors 109 and 133 in the discharge circuits of capacitors 107 and 131 to determine the proper time-off and time-on periods during which welding current is to be supplied to the load circuit 1. Let it be assumed that resistors 109 and 133 have been set so that capacitors 107 and 131 interpose no delay in the conduction of electric valves 90 and 124 in trailing response to the conduction of electric valves 100 and 92. This will cause the system to operate for periods of two cycles on and two cycles off of the flow of welding current.

Switches 7 will be closed in order to connect the system with the alternating current source of supply 2 and, after the necessary delay period in order to permit the heating filaments of the several valves disclosed to bring these valves into operating condition, the operator may initiate operation of the system by closing the push-button switch 142.

Under standby conditions and prior to the closing of push-button switch 142, both of the controlled rectifiers 58 are conducting because their control elements 67 are at cathode potential. While controlled rectifiers 58 are conducting, the more negative of the bias voltages supplied by winding sections 59 of the secondary 36 of transformer 37 and the phase shift control voltages supplied by the secondaries 61 of control transformers 62 are applied to the control elements 66 of relay electric valves 38 and 45, holding them nonconducting. When relay electric valves 38 and 45 are held nonconducting, control transformers 24 and 29 apply hold-off voltages to the control elements of the firing valves 13 and 14. Consequently the load circuit 1 is not connected with the supply circuit 3 because the main electric valves 8 and 9 are nonconducting due to the nonconductivity of their firing valves 13 and 14.

When push-button switch 142 is closed, keying electric valve 100 is rendered conducting at the beginning of its positive half cycle of anode voltage and will cause leading turn-on electric valve 90 to become conducting in trailing response at the beginning of its positive half cycle of anode voltage which corresponds to the negative half cycle of anode voltage of keying electric valve 100, which follows immediately after its positive half cycle of anode voltage during which this valve was conducting. Leading turn-on electric valve 90 becomes conducting in response to the trailing voltage drop across keying electric valve 100, which continues over for ten or fifteen degrees into the negative half cycle of this valve which corresponds to the positive half cycle of anode voltage for leading turn-on electric valve 90.

When leading turn-on electric valve 90 becomes conducting, it connects the primary winding 89 of transformer 79 across terminals 34 and 40 of the secondary 36 of transformer 37 thereby supplying through its secondary 82 a voltage to the control element 67 of the lower rectifier 58 which will render this rectifier nonconducting. When this rectifier 58 becomes nonconducting, the bias voltage of winding section 59 connected in circuit therewith is removed from the control element to cathode circuit of relay electric valve 38, which thereupon becomes conducting in response to the phase shift control voltage applied to its control element through the secondary 61 of control transformer 62, the primary 68 of which is connected across the output terminals of an adjustable static phase shift circuit.

This operation may be better understood by referring to the graphic representation of the anode and control element voltages of relay electric valve 38 shown in Fig. 2 of the drawings. As shown in Fig. 2, the anode voltage of relay valve 38 has been identified by reference numeral 34v and the negative bias voltage of the lower winding section 59 of the secondary 36 of transformer 37 has been identified by the reference numeral 59v. The phase shift voltage of the control transformer 62 has been identified by the reference numeral 61v. Thus during the period when the lower rectifier 58 is conducting, the control element voltage applied to the control element 56 of relay electric valve 38 corresponds to the irregular curve made up by the more negative of 59v and 61v shown in Fig. 2 as a heavy continuous line. These conditions prevail until, at about point 82, the lower rectifier 58 is rendered nonconducting by the voltage of the secondary winding 82 of transformer 79. This voltage resulted from turn-on electric valve 90 becoming conducting at the beginning of its positive anode voltage corresponding to the voltage wave 34v shown in Fig. 2. It will be recalled that leading turn-on electric valve became conducting in response to the trailing voltage drop across keying electric valve 100, which was conducting during the negative half cycle of voltage wave 47v shown in Fig. 2. After the lower rectifier 58 has been rendered nonconducting, the control element 56 of relay electric valve 38 has impressed thereon only the phase shift control voltage supplied by the secondary 61 of control transformer 62 and shortly thereafter, at about point 61a, relay electric valve 38 becomes conducting to reverse the phase of the voltage of control transformer 24 and render firing electric valve 14 conducting. This firing valve, in turn, renders its main valve conducting and one half cycle of the source of supply 2 is supplied through the lower supply conductor 3, main electric valve 9, conductor 5 and the other supply conductor 3, to the primary winding of the welding transformer 6.

Trailing turn-on electric valve 92 will become conducting in response to the lagging voltage drop across the anode-cathode circuit of leading turn-on electric valve 90. When lagging turn-on electric valve 92 becomes conducting, it connects the primary winding 91 of transformer 80 across terminals 47 and 40 of the secondary 36 of transformer 37, thereby supplying through its secondary 86 a voltage to the control element 67 of the upper rectifier 58 which renders this rectifier nonconducting. When this occurs, the biasing voltage of the upper winding section 59 of the secondary 36 of transformer 37 is removed from the control element to cathode circuit of relay electric valve 45, which thereupon becomes conducting in response to the phase shift control voltage applied to its control element through the secondary 61 of control transformer 62. Thereafter control element 56 of relay electric valve 45 has impressed thereon only the phase shift control voltage supplied by the secondary 61 of control transformer 62. In the manner above described with regard to relay electric valve 38, relay electric valve 45 becomes conducting, reversing the phase of the voltage of control transformer 29 and rendering firing electric valve 13 conducting. This firing valve, in turn, renders its main electric valve 8 conducting and the next half cycle of the source of supply 2 is applied to the load circuit.

Turn-off electric valve 124 becomes conducting in trailing response to the voltage drop across the lagging turn-on electric valve 92 since, as previously stated, timing capacitor 131 interposes no time delay by reason of the adjustment of its discharge resistor 133. When turn-off electric valve 124 becomes conducting, it connects the primary 127 of transformer 128 across terminals 34 and 40 of the secondary 36 of transformer 37 and supplies through its secondary 140 a bucking-out voltage in the control element circuit of keying electric valve 100. This bucking-out voltage will prevent keying electric valve 100 from becoming conducting at the beginning of its positive half cycle of anode voltage.

When turn-off electric valve 124 became conducting, leading turn-on electric valve 90 also became conducting in response to the lagging voltage drop across keying electric valve 100. The conductivity of leading turn-on electric valve 90 caused the lagging turn-on electric valve to become conducting in trailing response thereto. Thus in the sequence described, the leading and trailing turn-on electric valves 90 and 92 are each twice rendered conducting, thereby causing, as described above, the main electric valves 8 and 9 to be conducting for two cycles of the alternating current source of supply. Each time lagging turn-on electric valve 92 became conducting, it caused turn-off electric valve 124 to become conducting and it, in turn, prevented the keying electric valve 100 from becoming conducting. Consequently keying electric valve 100 was held nonconductive for two cycles of the source of supply, for while this keying electric valve is held nonconducting, the leading and trailing turn-on electric valves 90 and 92 are also held nonconducting. This means that for two cycles of the source of supply the main electric valves 8 and 9 are held nonconducting and the supply of load current is interrupted for two cycles of the source of supply.

If it is desired to operate the system to supply current for two cycles and interrupt the supply of current for three cycles, this may be accomplished by setting the discharge resistor 109 for timing capacitor 107 to interpose a one-cycle delay in the trailing response of leading turn-on electric valve 90 to conduction of keying electric valve 100. With such adjustment the leading turn-on electric valve will not become conducting the first time that keying electric valve 100 becomes conducting, but only when the keying electric valve becomes conducting for a second time after the delay of one cycle interposed by the timing capacitor 107 and its discharge circuit 109.

If, on the other hand, it is desired to operate the system with current flow for three cycles and no current flow for the following two cycles, this can be accomplished by setting the discharge resistor 133 for capacitor 131 to interpose a one-cycle delay in the trailing response of the conduction of turn-off electric valve 124 to the lagging voltage drop across trailing turn-on electric valve 92.

In like manner, other adjustments of the system may be had wherein the time-on and time-off periods are increased. It will be noted, however, that the minimum time-off period is two cycles resulting from turn-off electric valve 124 operating at least twice for each sequence of operations. Furthermore, the minimum time-on period is also two cycles because leading turn-on electric valve 90 will always operate a second time before the bucking-out voltage of turn-off electric valve 124 becomes effective by rendering keying electric valve 100 nonconducting to prevent leading turn-on electric valve 90 becoming conducting.

For periods of one cycle on and one cycle or more off, switch 145 is closed and switch 134 is open. The opening of switch 134 effectively biases off turn-off electric valve 124 so that it never becomes conducting. The closure of switch 145 causes conduction of leading turn-on electric valve 90 to energize the bucking-out transformer 128 so that the keying electric valve 100 is rendered nonconducting during each half cycle of its positive anode voltage immediately following the positive half cycle of anode voltage during which leading turn-on electric valve 90 was conducting. Under such circumstances, the system operates in continuous fashion to supply current to the load device for one cycle and to interrupt the flow of current to the load circuit for one cycle.

With the switch 145 closed and the switch 134 open, it is possible to have the system operate for one cycle on and two cycles off by adjusting the resistor 109 of timing capacitor 107 to interpose a one-cycle delay in the trailing response of leading turn-on electric valve 90 to the trailing voltage drop across keying electric valve 100. This off period may be further increased to three cycles or more by adjusting the discharge resistor 109 of timing capacitor 107 to interpose a two or more cycle delay in the conduction of leading turn-on electric valve in response to the trailing voltage drop across keying electric valve 100.

It is not possible to have the system operate for two or more cycles on and one cycle off unless the turn-off electric valve 124 is caused to conduct only once for each of the times the turn-on electric valves 90 and 92 become conducting. This effect may be accomplished, however, by connecting the control element 129 of turn-off electric valve 124 to the anode of keying electric valve 100 through a circuit including a rectifier having its anode connected toward control element 129 of electric valve 124 and opening switch 145 and closing switch 134 to restore the system to the operation first described. With the connection described between the control element 129 of turn-off electric valve 124 and the anode of keying electric valve 100, this control element 129 will be tied through the rectifier described to the source of negative bias voltage of terminal 47 of the secondary 36 of transformer 37 so that turn-off electric valve 124 can only be conducting once in each sequence of operations during which the on period may be adjusted for two or more cycles by proper adjustment of timing capacitor 131 by means of its discharge resistor 133.

The system above described in Fig. 1 of the drawings may be modified as shown in Fig. 3 to eliminate control transformers 79 and 80 by substituting therefor the networks including the inductive load device 146, 147 and resistors 148 and 149 connected in series with one another across terminals 34 and 47 of the secondary 36 of transformer 37, and inductive load device 150, 151 and resistors 152 and 153 connected in series with one another across terminals 47 and 34 of the secondary 36 of transformer 37. As shown in Fig. 3, inductive load device 146, 147 is connected across terminals 34 and 40 of the seconday 36 of transformer 37 through leading turn-on electric valve 90, and inductive load device 150, 151 is connected across terminals 47 and 40 through trailing turn-on electric valve 92. Furthermore, the control element 67 of the lower controlled rectifier 58 is connected to common terminal 154 of resistors 148 and 149, and the control element 67 of the upper rectifier 58 is connected to the common terminal 155 of resistors 152 and 153. The arrangement is such that when leading turn-on electric valve 90 becomes conducting, the voltage of terminal 154 goes negative sufficiently to render the lower rectifier 58 nonconducting by impressing a negative control voltage on its control element 67. In like manner, a negative control voltage sufficient to render the upper electric valve 58 nonconducting is impressed on its control element 67 whenever trailing turn-on electric valve 92 becomes conducting. Sufficient other details of the system illustrated in Fig. 1 have been illustrated in Fig. 3 and identified by like reference numbers in order to indicate how this modification is accomplished without repeating in its entirety the control circuit shown in Fig. 1.

It is, of course, apparent that my invention may be variously modified without departing from the spirit and scope of the teachings thereof. Thus, for example, when the current demand of the load circuit is not great, the firing electric valves 13 and 14 may be substituted for the main electric valves 8 and 9 in order to supply alternating current to the load device from the source of supply. Other arrangements, of course, will occur to those skilled in the art when using electric valves other than the thyratron or ignitron types specifically referred to without in any respect departing from my invention embodied in the system above described.

Therefore, while I have shown and described particular embodiments of my invention, it will be obvious to those skilled in the art that many changes other than those specified and suggested above may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. Apparatus comprising an alternating current supply circuit, an electric valve having an anode, a cathode and a control element, means for energizing the anode-cathode circuit of said electric valve with alternating current from said supply circuit, a control element circuit for applying to said control element of said electric valve a negative bias voltage and a control voltage, means interposed in circuit with said control element for selectively and automatically impressing on said control element that one of said bias and control voltages which is the more negative, said means including a resistor and a second electric valve having an anode, a cathode and a control element, said resistor and said second electric valve being connected to one another and respectively to said control and bias voltages to form two branches of said control element circuit which are connected in parallel with one another between the control element and cathode of said first mentioned electric valve, one terminal of each of said control and bias voltages being directly connected to one another and to the cathode of said first mentioned electric valve and the other terminal of each of said control and bias voltages being connected to one another and to the control element of said first mentioned electric valve through said resistor and the anode-cathode circuit of said second electric valve respectively with the anode of said second electric valve being directed towards said resistor and said control element of said first mentioned electric valve, a control element circuit for said second electric valve, and means for applying a control voltage in said control element circuit of said second electric valve which renders said second electric valve nonconducting and thereby disconnects said bias voltage from the control element circuit of said first mentioned electric valve.

2. Apparatus comprising an alternating current supply circuit, an electric valve connected to be energized from said supply circuit and having an anode, a cathode and a control element, a control element circuit for applying a negative bias voltage and an adjustable phase sine wave control voltage to said control element, means interposed in circuit with said control element for selectively and automatically impressing on said control element that one of said bias and control voltages which is the more negative, said means including a resistor and a second electric valve having an anode, a cathode and a control element, said resistor and said second electric valve being connected to one another and respectively to said control and bias voltages to form two branches of said control element circuit which are connected in parallel with one another between the control element and cathode of said first mentioned electric valve, one terminal of each of said control and bias voltages being directly connected to one another and to the cathode of said first mentioned electric valve and the other terminal of each of said control and bias voltages being connected to one another and to the control element of said first mentioned electric valve through said resistor and the anode-cathode circuit of said second electric valve respectively with the anode of said second electric valve being directed towards said resistor and said control element of said first mentioned electric valve, a control element circuit for said second electric valve, and means for applying a control voltage in said control element circuit of said second electric valve which renders said second electric valve nonconducting and thereby disconnects said bias voltage from the control element circuit of said first mentioned electric valve.

3. Apparatus comprising an alternating current supply circuit, an electric valve connected to be energized from said supply circuit and having an anode, a cathode and a control element, a source of control voltage and a source of bias voltage each of which has one of its terminals connected together and directly to the cathode of said electric valve and each of which has the other of its terminals connected respectively through a resistor and a rectifier to the control element of said electric valve, said rectifier having an anode, a cathode, a control element and having its anode connected toward said resistor and said control element of said electric valve, a control element circuit for said rectifier and means for applying a control voltage in said control element circuit of said rectifier which renders said rectifier nonconducting and thereby disconnects said bias voltage from the control element circuit of said electric valve.

4. Apparatus comprising an alternating current supply circuit, an electric valve having an anode, a cathode and a control element, a circuit connected with said supply circuit through the anode-cathode circuit of said electric valve, a source of control voltage and a source of bias voltage each of which has one of its terminals connected together and directly to the cathode of said electric valve and each of which has the other of its terminals connected respectively through a resistor and a rectifier to the control element of said electric valve, said rectifier having an anode, a cathode, a control element and having its anode connected toward said resistor and said control element of said electric valve, a control element circuit for said rectifier, means for applying a control voltage in said control element circuit of said rectifier which renders said rectifier nonconducting and thereby disconnects said bias voltage from the control element circuit of said electric valve, and means for rendering said last mentioned means alternately effective and ineffective for predetermined adjustable periods of time.

5. Apparatus comprising an alternating current supply circuit, a loud circuit, electric translating apparatus interconnecting said circuits and including an electric valve which controls by its conductivity the supply of current through said translating apparatus from said supply circuit to said load circuit, said electric valve having an anode, a cathode and a control element and having its anode-cathode circuit connected for energization from said supply circuit, a control element circuit for applying to said control element of said electric valve a negative bias voltage and a control voltage of said supply circuit which is adjustable in phase relative to the anode-cathode voltage of said electric valve, means interposed in circuit with said control element for selectively and automatically impressing on said control element that one of said bias and control voltages which is the more negative, said means including a resistor and a second electric valve having an anode, a cathode and a control element, said resistor and said second electric valve being connected to one another and respectively to said control and bias voltages to form two branches of said control element circuit which are connected in parallel with one another between the control element and cathode of said first mentioned electric valve, one terminal of each of said control and bias voltages being directly connected to one another and to the cathode of said first mentioned electric valve and the other terminal of each of said control and bias voltages being connected to one another and to the control element of said first mentioned electric valve through said resistor and the anode-cathode circuit of said second electric valve respectively with the anode of said second electric valve being directed towards said resistor and said control element of said first mentioned electric valve, a control element circuit for said second electric valve, and means for applying a control voltage in said control element circuit of said second electric valve which renders said second electric valve nonconducting and thereby disconnects said bias voltage from the control element circuit of said first mentioned electric valve.

6. Apparatus comprising a supply circuit, a load circuit, electric translating apparatus interconnecting said circuits and including an electric valve which controls by its conductivity the supply of current through said translating apparatus from said supply circuit to said load circuit, said electric valve having an anode, a cathode and a control element, means for applying an alternating voltage to the anode-cathode circuit of said electric valve, a control element circuit for applying to said control element of said electric valve a negative bias voltage and an alternating voltage of said last mentioned means which is adjustable in phase relative to the anode-cathode voltage of said electric valve, means interposed in circuit with said control element for selectively and automatically impressing on said control element that one of said bias and alternating voltages which is the more negative, said means including a resistor and a second electric valve having an anode, a cathode and a control element, said resistor and said second electric valve being connected to one another and respectively to said control and bias voltages to form two branches of said control element circuit which are connected in parallel with one another between the control element and cathode of said first mentioned electric valve, one terminal of each of said control and bias voltages being directly connected to one another and to the cathode of said first mentioned electric valve and the other terminal of each of said control and bias voltages being connected to one another and to the control element of said first mentioned electric valve through said resistor and the anode-cathode circuit of said second electric valve respectively with the anode of said second electric valve being directed towards said resistor and said control element of said first mentioned electric valve, a control element circuit for said second electric valve, and means for applying a control voltage in said control element circuit of said second electric valve which renders said second electric valve nonconducting and thereby disconnects said bias voltage from the control element circuit of said first mentioned electric valve.

7. Apparatus comprising two electric valves each of which has an anode, a cathode and a control element, a control transformer having primary and secondary windings, a direct electrical connection between the cathodes of said electric valves, means for supplying alternating voltage to said electric valves so that one of said electric valves may conduct during half cycles of voltage of one polarity and the other of said electric valves may conduct during half cycles of voltage of the opposite polarity, said means providing an inductive circuit through one of said electric valves and a circuit through the other of said electric valves including the primary winding of said control transformer, means for connecting the control element of the other of said electric valves to the anode connection of said one of said electric valves in its said inductive circuit, and means including a control circuit completed through the secondary winding of said control transformer for applying between the control element and cathode of said one of said electric valves a control voltage which is opposed to and overcome by the voltage induced in the secondary of said control transformer, said control voltage rendering said one of said electric valves conducting until said second electric valve becomes conducting and energizes the primary winding of said control transformer to produce in said control circuit a voltage rendering said one of said electric valves nonconducting.

8. Apparatus comprising a supply circuit, a pair of electric valves each of which has an anode, a cathode and a control element, a direct electrical connection between the cathodes of said electric valves, means for energizing said electric valves from said supply circuit so that one of said electric valves has applied thereto a positive anode voltage at the same time that the other of said electric valves has applied thereto a negative anode voltage, said means including an inductive circuit completed through the anode-cathode circuit of one of said electric valves, means for applying to the control element of said one of said electric valves a hold-off voltage that is 180 degrees out of phase with its positive anode voltage to maintain said electric valve nonconducting, means for applying a firing voltage to the control element of said one of said electric valves that leads its positive anode voltage by an amount less than 180 degrees so that said one of said electric valves may be rendered conducting only at the beginning of its positive half cycle of anode voltage, means for connecting the control element of the other of said electric valves to the anode connection of said one electric valve in its said inductive circuit, and means responsive to current flow through the anode-cathode circuit of said other electric valve for introducing into the control element circuit of said one electric valve a voltage opposing its said firing voltage and of sufficient magnitude to prevent said one electric valve from becoming again conductive in response to its said firing voltage during the positive half cycle of its anode voltage immediately following the half cycle of voltage during which conduction occurred through said other electric valve.

9. Apparatus comprising an alternating current supply circuit, a control transformer having primary and secondary windings, a pair of electric valves each of which has an anode, a cathode and a control element, a direct electrical connection between the cathodes of said electric valves, means for energizing said electric valves from said supply circuit so that one of said electric valves has applied thereto a positive anode voltage at the same time that the other of said electric valves has applied thereto a negative anode voltage, said means comprising an inductive circuit completed through the anode-cathode circuit of one of said electric valves and a circuit including the primary winding of said control transformer completed through the anode-cathode circuit of the other of said electric valves, means responsive to anode-cathode conduction of said one of said electric valves for applying to the control element of said other of said electric valves a voltage that renders said other of said electric valve conducting, means for supplying a hold-off voltage to the control element of said one of said electric valves that is 180 degrees out of phase with its positive anode voltage to maintain said electric valve nonconducting, and means in circuit with the secondary winding of said control transformer for applying a firing voltage to the control element of said one of said electric valves that leads its positive anode voltage by an amount less than 180 degrees so that said one electric valve may be rendered conducting early in its positive half cycle or not at all, said secondary winding of said control transformer being connected in said circuit to overcome and apply a hold-off voltage to the control element of said one electric valve that prevents said one electric valve from again conducting in response to its said firing voltage during the positive half cycle of its anode voltage that immediately follows its negative half cycle of anode voltage during which said other electric valve was conducting.

10. Apparatus comprising an alternating current supply circuit, a control transformer having primary and secondary windings, a pair of electric valves each of which has an anode, a cathode and a control element, a direct electrical connection between the cathodes of said electric valves, means for energizing said electric valves from said supply circuit so that one of said electric valves has applied thereto a positive anode voltage at the same time that the other of said electric valves has applied thereto a negative anode voltage, said means comprising an inductive circuit completed through the anode-cathode circuit of one of said electric valves and a circuit including the primary winding of said control transformer completed through the anode-cathode circuit of the other of said electric valves, a timing capacitor, means responsive to the nonconductivity of said one of said electric valves for charging said capacitor from said supply circuit, an adjustable discharge circuit for said capacitor, means connecting the control element of the other of said electric valves in circuit with said capacitor to be responsive to that voltage of said inductive circuit which appears across the anode-cathode circuit of said one of said electric valves, means for supplying a hold-off voltage to the control element of said one of said electric valves that is 180 degrees out of phase with its positive anode voltage to maintain said electric valve nonconducting, and means in circuit with the secondary winding of said control transformer for applying a firing voltage to the control element of said one of said electric valves that leads its positive anode voltage by an amount less than 180 degrees so that said one electric valve may be rendered conducting early in its positive half cycle or not at all, said secondary winding of said control transformer being connected in said circuit to overcome and apply a hold-off voltage to the control element of said one electric valve that prevents said one electric valve from again conducting in response to its said firing voltage during the positive half cycle of its anode voltage that immediately follows its negative half cycle of anode voltage during which said other electric valve was conducting.

11. Apparatus comprising an alternating current supply circuit, a load circuit, means including a pair of main electric valves reversely connected in parallel with one another for supplying alternating current from said supply circuit to said load circuit, each of said electric valves having an anode, a cathode and a control element, means for alternately applying in circuit with the control element of said main electric valves components of control voltage rendering said pair of main electric valves conducting and nonconducting, said means including a pair of relay electric valves having anodes, cathodes and control elements and having their anode-cathode circuits connected with said supply circuit so that one of said relay electric valves may conduct during half cycles of voltage of one polarity and the other may conduct during half cycles of voltage of the opposite polarity of said supply circuit, a source of control voltage and a source of bias voltage for each of said relay electric valves, one terminal of each of said sources of control and bias voltage being connected together and to the cathodes of said relay electric valves and the other terminal of each of said sources of control and bias voltages being connected respectively through a resistor and a rectifier to the control elements of said relay electric valves, said rectifiers having anodes, cathodes and control elements and having their anodes connected toward said resistors and said control elements of said relay electric valves, means for alternately applying in circuit with the control elements of said rectifiers voltages rendering said rectifiers conducting and nonconducting, said means including a pair of control electric valves having anodes, cathodes and control elements and having their anode-cathode circuits connected with said supply circuit so that one of said control electric valves may conduct during half cycles of voltage of one polarity and the other may conduct during half cycles of voltage of the opposite polarity of said supply circuit, means responsive to current flow through the anode-cathode circuit of one of said control electric valves for applying a control potential to the control element of the other of said control electric valves which renders said other control electric valve conducting in trailing response to the conduction of said one of said control electric valves, and means for applying in circuit with the control element of said one of said control electric valves voltages rendering said one of said control electric valves conducting and nonconducting.

12. Apparatus comprising an alternating current supply circuit, a load circuit, means including a pair of main electric valves reversely connected in parallel with one another for controlling the time-on and time-off periods of alternating current flow from said supply circuit to said load circuit, each of said electric valves having an anode, a cathode and a control element, means for applying control voltages to the control elements of said main electric valves for rendering said main electric valves conducting and nonconducting, said means including a keying electric valve, a leading turn-on electric valve, a trailing turn-on electric valve, and a turn-off electric valve, each of said control electric valves having an anode, a cathode and a control element, a direct electrical connection between the cathodes of said control electric valves, means for energizing the anode-cathode circuits of said control electric valves from said supply circuit through inductive circuits so that said leading turn-on electric valve and said turn-off electric valve are energized by an alternating current voltage 180 degrees out of phase with the alternating current voltage of said supply circuit which energizes said keying electric valve and said trailing turn-on electric valve, a time-off capacitor, means for connecting the control element circuit of said leading turn-on electric valve in circuit with said time-off capacitor to the anode connection of said keying electric valve in its said inductive circuit, means for connecting the control element of said trailing turn-on electric valve to the anode connection of said leading turn-on electric valve in its said inductive circuit, a time-on capacitor, means for connecting the control element of said turn-off electric valve in circuit with said time-on capacitor to the anode connection of said trailing turn-on electric valve in its said inductive circuit, means for charging said time-off capacitor in response to the nonconductivity of said keying electric valve, means for charging said time-on capacitor in response to the nonconductivity of said trailing turn-on electric valve, adjustable means individual to each of said capacitors for controlling their discharge rates, means for rendering said keying electric valve conducting at the beginning of a half cycle of its positive anode voltage, and means responsive to current flow through the anode-cathode circuit of said turn-off electric valve for preventing said keying electric valve from again becoming conducting during its positive half cycle of anode voltage which follows immediately after the positive half cycle of anode voltage during which conduction occurred through said turn-off electric valve.

MAURICE E. BIVENS.

REFERENCES CITED

The following references are of record in the file of this patent:

UNITED STATES PATENTS

| Number | Name | Date |
|---|---|---|
| 2,112,682 | Ryder | Mar. 29, 1938 |
| 2,306,784 | Lord | Dec. 29, 1942 |
| 2,332,325 | Zevoy | Oct. 19, 1943 |
| 2,340,131 | Lord | Jan. 25, 1944 |
| 2,373,545 | Cooper | Apr. 10, 1945 |
| 2,404,643 | Livingston | July 23, 1946 |